E. WOLFF.
CINEMATOGRAPHIC ARRANGEMENT.
APPLICATION FILED JUNE 26, 1920.

1,397,346. Patented Nov. 15, 1921.

Inventor
Eugen Wolff
By William C. Linton
Attorney

UNITED STATES PATENT OFFICE.

EUGEN WOLFF, OF TEMPELHOF, NEAR BERLIN, GERMANY.

CINEMATOGRAPHIC ARRANGEMENT.

1,397,346.	Specification of Letters Patent.	Patented Nov. 15, 1921.

Application filed June 26, 1920. Serial No. 392,066.

*To all whom it may concern:*

Be it known that I, EUGEN WOLFF, working manager, a citizen of the German Republic, residing at Nos. 27–28 Oberlandstrasse, Tempelhof, near Berlin, Germany, have invented certain new and useful Improvements in Cinematographic Arrangements, of which the following is a specification.

According to this invention which is for the reproduction of cinematographic representations, the representations are projected by means of a single cinematograph onto a non-transparent portion of a screen and at the same time onto a transparent portion thereof in such a manner that both projections will appear in the same position, that is, with their right and left hand sides according with one another, both to spectators contemplating the front side and those looking at the back side of the screen.

To such end my invention consists in a novel arrangement of mirrors or reflectors to coöperate with the cinematograph, the latter being, for example, placed laterally of the spectators.

My invention will be understood from the following description and be particularly pointed out in the appended claims, reference being had to the accompanying drawing.

Figure 1:
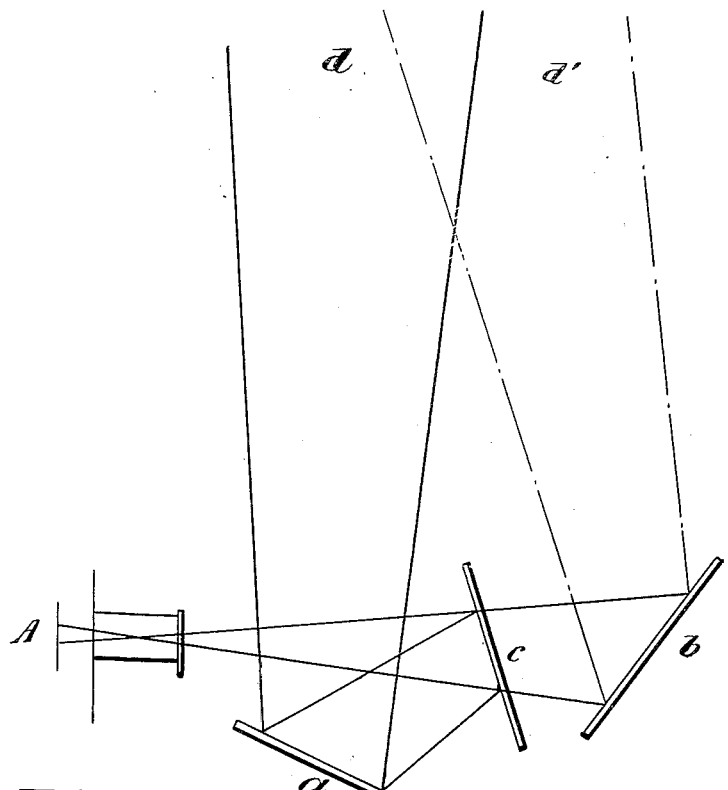
Figure 2:
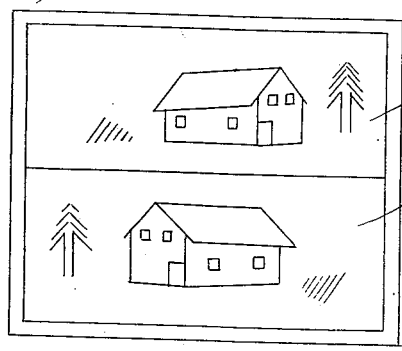

Figure 1 is a diagrammatic plan of a form of construction embodying my invention; and Fig. 2 is an elevation of the screen.

A denotes the cinematograph placed laterally of the space to be occupied by the spectators. *a*, *b* are two mirrors inclined with regard to one another as well as to the optic axis of the object glass of the cinematograph. Between the mirrors *a*, *b* a transparent reflector *c* is disposed so that two projections or two series of representations will result: The reflector *c* reflects the representations of the cinematograph A toward the mirror *a* while allowing the same representations to be reflected by the mirror *b*, the mirror *a* projecting them onto the lower, non-transparent half *d* of the screen, the mirror *b* onto the upper half *d'* thereof which is transparent. In this way two images are so produced that the one seen by the spectators looking at the front side of the screen will in all respects accord with the image contemplated by the spectators regarding the back side thereof.

This invention is adapted to advantage for all kinds of cinematographic representations, especially also for the method, described in Letters Patent 1286383, of conducting an orchestra by using a cinematograph projecting representations of the orchestra conductor.

Two separate screens may be employed instead of merely one for the two series of images.

I claim:

1. In a cinematographic arrangement, the combination of a cinematograph with a screen, consisting of a transparent and a non-tranparent portion, and reflectors to project a series of representations onto the non-transparent portion and a second series, the reverse of the former as to the right and left hand sides, onto the transparent portion of the said screen, substantially as set forth.

2. In a cinematographic arrangement, the combination of a cinematograph with a screen, consisting of a transparent and a non-transparent portion, two mirrors inclined to the optic axis of the objective glass of the cinematograph and to one another, and a transparent reflector disposed between the said mirrors and in the optic axis of the cinematograph, substantially as set forth.

In testimony whereof I affix my signature.

EUGEN WOLFF.